United States Patent
Zhuang

(10) Patent No.: US 9,885,570 B2
(45) Date of Patent: Feb. 6, 2018

(54) ELECTRONIC CIRCUIT FOR ACOUSTO-OPTOELECTRONIC ANGLE INDICATION AND LEVEL GAUGE THEREOF

(71) Applicant: ZHEJIANG RONGSHENG TOOL CO., LTD., Jinhua, Zhejiang (CN)

(72) Inventor: Chengrong Zhuang, Zhejiang (CN)

(73) Assignee: ZHEJIANG RONGSHENG TOOL CO., LTD., Jinhua (CN)

( * ) Notice: Subject to any disclaimer, the term of this patent is extended or adjusted under 35 U.S.C. 154(b) by 147 days.

(21) Appl. No.: 15/065,898

(22) Filed: Mar. 10, 2016

(65) Prior Publication Data

US 2017/0219344 A1 Aug. 3, 2017

(30) Foreign Application Priority Data

Feb. 3, 2016 (CN) .......................... 2016 1 0077786

(51) Int. Cl.
*G01C 9/06* (2006.01)
*G01C 9/32* (2006.01)

(52) U.S. Cl.
CPC ................. *G01C 9/06* (2013.01); *G01C 9/32* (2013.01); *G01C 2009/062* (2013.01); *G01C 2009/066* (2013.01); *G01C 2009/068* (2013.01)

(58) Field of Classification Search
CPC ........................................................ G01C 9/06
USPC ....................................... 33/351, 366.11, 379
See application file for complete search history.

(56) References Cited

U.S. PATENT DOCUMENTS

| | | | |
|---|---|---|---|
| 2005/0210691 A1* | 9/2005 | Solak ........................ | G01C 9/06 33/366.24 |
| 2008/0172894 A1* | 7/2008 | Chang ....................... | G01C 9/06 33/366.16 |
| 2013/0138393 A1* | 5/2013 | Weibezahn ............... | G01C 9/06 702/154 |
| 2013/0160547 A1* | 6/2013 | Lee ........................ | G01P 15/125 73/514.28 |
| 2014/0101950 A1* | 4/2014 | Zhuang ..................... | G01C 9/32 33/348.2 |
| 2016/0084648 A1* | 3/2016 | Zhuang .................. | G01B 21/22 702/151 |
| 2016/0138916 A1* | 5/2016 | Neitzell ................... | G01C 9/32 33/381 |
| 2016/0334200 A1* | 11/2016 | Zhuang .................... | G01B 3/56 |

* cited by examiner

*Primary Examiner* — G. Bradley Bennett

(57) ABSTRACT

The present invention discloses an electronic circuit for acousto-optoelectronic angle indication and a level gauge thereof. The electronic circuit for acousto-optoelectronic angle indication comprises a main control circuit (a), a power circuit (b), a key circuit (c), a sensor module circuit (d), an LED indicator module circuit (e), a buzzer module circuit (f) and a data storage module (g). The control circuit (a) comprises a microcontroller (U2), a capacitor (C2), a capacitor (C3), a capacitor (C4), a capacitor (C5), a capacitor (C6), a capacitor (C8), an electrolytic capacitor (E1), a resistor (R11), a resistor (R12) and a resistor (R20). The invention realizes an acousto-optoelectronically indicated design circuit device with high precision, so that the current angular value state can be accurately displayed through acoustic and photoelectric changes by simply placing a measuring device on a test plane.

5 Claims, 9 Drawing Sheets

US 9,885,570 B2

ELECTRONIC CIRCUIT FOR ACOUSTO-OPTOELECTRONIC ANGLE INDICATION AND LEVEL GAUGE THEREOF

CROSS-REFERENCE TO RELATED APPLICATIONS

The present application claims the benefit of Chinese Patent Application No. 201610077786.6 filed on Feb. 3, 2016, the contents of which are hereby incorporated by reference.

FIELD OF THE INVENTION

The invention relates to an electronic circuit, in particular to an electronic circuit for acousto-optoelectronic angle indication and a level gauge thereof.

BACKGROUND

During such work as house decoration, maintenance and installation of equipment and materials, the angular value states (e.g., horizontal and vertical) of objects are usually measured and corrected. Existing level bars are mainly read by unaided eyes. It takes time to analyze in work with higher precision, and large precision errors exist, bringing inconvenience to the work, mainly because the control design of the level bar is imperfect. Since observing whether the level bubble is in the middle position of two scale lines with eyes easily results in visual errors, and it is difficult to accurately observe the position of the level bubble in environment with poor light, it is difficult to accurately judge whether an object reaches the set planar state, and thus it is uncertain whether the checked and corrected object can reach the required planar state.

SUMMARY OF THE INVENTION

To overcome the defects in the prior art, the invention provides an acousto-optoelectronically indicated design circuit device with high precision, so that the current angular value state can be accurately displayed through acoustic and photoelectric changes by simply placing a measuring device on a test plane, thus dispensing with routine complex operations.

The purpose of the invention is realized by the following technical scheme:

an electronic circuit for acousto-optoelectronic angle indication, comprising a main control circuit (a), a power circuit (b), a key circuit (c), a sensor module circuit (d), an LED indicator module circuit (e), a buzzer module circuit (f) and a data storage module (g), wherein:

the control circuit (a) comprises a microcontroller U2, a capacitor C2, a capacitor C3, a capacitor C4, a capacitor C5, a capacitor C6, a capacitor C8, an electrolytic capacitor E1, a resistor R11, a resistor R12 and a resistor R20, one end of the capacitor C2 is connected with the 6th pin of the microcontroller U2, and the other end of the capacitor C2 is grounded; the 5th pin of the microcontroller U2 is connected with a +2.4V power supply, and connected with one end of the capacitor C3, one end of the capacitor C6, one end of the resistor R12 and the 9th pin of the microcontroller U2 in parallel, the other end of the capacitor C3 is grounded, the other end of the capacitor C6 is grounded, the other end of the resistor R12 is connected with one end of the resistor R11, one end of the capacitor C8 and the 10th pin of the microcontroller U2 in parallel, the other end of the resistor R11 is grounded, and the other end of the capacitor C8 is grounded; the 24th pin of the microcontroller U2 is connected with a +3.3V power supply, and connected with one end of the resistor R20, one end of the electrolytic capacitor E1 and one end of the capacitor C5 in parallel, the other end of the capacitor C5 is grounded, the other end of the electrolytic capacitor E1 is grounded, and the other end of the resistor R20 is connected with one end of the capacitor C4 and the 15th pin of the microcontroller U2 in parallel;

the power circuit (b) comprises a power interface (BATT), a field effect transistor Q8, a resistor R1, a capacitor C11, an electrolytic capacitor E2 and a voltage regulator module U1, one positive input end of the power interface (BATT) is connected with one end of the resistor R1, one end of the electrolytic capacitor E2 and the 2nd pin of the voltage regulator module U1 in parallel, and the other end of the power interface (BATT) is connected with a D pole of the field effect transistor Q8; the other end of the resistor R1 is connected with a G pole of the field effect transistor Q8 and one end of the capacitor C11 in parallel; the other end of the capacitor C11 and a S pole of the field effect transistor Q8 are grounded in parallel; the 1st pin of the voltage regulator module and the electrolytic capacitor E2 are grounded in parallel; and the 3rd pin of the voltage regulator module U1 is connected with a +3.3V power voltage;

the key circuit (c) comprises a key (SW), one end of the key (SW) is connected with the 16th pin of the microcontroller U2, and the other end of the key (SW) is grounded;

the sensor module circuit (d) comprises a sensor chip U4, a resistor R21, a capacitor C13, a capacitor C14 and a capacitor C18, the 1st, 3rd, 4th, 5th, 6th, 7th, 9th, 11th, 13th and the 16th pins of the sensor chip U4 are grounded, and connected with one end of the capacitor C13, one end of the capacitor C14 and one end of the capacitor C18 in parallel; the 14th pin and the 15th pin of the sensor chip U4 are connected with the other end of the capacitor C18 and one end of the resistor R21 in parallel; the other end of the resistor R21 is connected with a +2.4V power supply; the 10th pin of the sensor chip U4 is connected with the other end of the capacitor C13 and the 13th pin of the microcontroller U2; and the 12th pin of the sensor chip U4 is connected with the other end of the capacitor C14 and the 11th pin of the microcontroller U2;

the LED indicator module circuit (e) comprises a red-green light LED1, a red-green light LED2, a red-green light LED3, a resistor R3, a resistor R4, a resistor R5, a resistor R14, a resistor R17 and a resistor R19, one end of the red-green light LED1 is connected with a 3.3V power supply, one green end of the red-green light LED1 is connected with one end of the resistor R5, and the other end of the resistor R5 is connected with the 4th pin of the microcontroller U2; one red end of the red-green light LED1 is connected with the resistor R4, and the other end of the resistor R4 is connected with the 3rd pin of the microcontroller U2; one end of the red-green light LED2 is grounded, one green end of the red-green light LED2 is connected with one end of the resistor R14, and the other end of the resistor R14 is connected with the 26th pin of the microcontroller U2; one red end of the red-green light LED2 is connected with the resistor R17, and the other end of the resistor R17 is connected with the 25th pin of the microcontroller U2; one end of the red-green light LED3 is grounded, one green end of the red-green light LED3 is connected with the resistor R3, and the other end of the resistor R3 is connected with the 23rd pin of the microcontroller U2; and one red end of the red-green light LED3 is connected with one end of the resistor R19, and the other end of the resistor R19 is connected with the 22nd pin 22 of the microcontroller U2;

the buzzer module circuit (f) comprises a buzzer (BUZ) and a resistor R22, one end of the buzzer BUZ is connected with the 2nd pin of the microcontroller U2, the other end of the buzzer is connected with one end of the resistor R22, and the other end of the R22 is connected with the 1rst pin of the microcontroller U2; and the data storage module g comprises a memory U3, a resistor R10 and a resistor R13, the 8th pin of the memory U3 is connected with a power supply, the 1st, 2nd, 3rd, and 4th pins of the memory U3 are grounded, the 5th pin of the memory U3 is connected with one end of the resistor R13, the other end of the resistor R13 is connected with the 26th pin of the microcontroller U2 and also connected with the resistor R10, the 6th pin of the memory U3 is connected with the 27th pin of the microcontroller U2, and the 6th pin of the memory U3 is grounded.

A level gauge comprising the aforementioned electronic circuit for acousto-optoelectronic angle indication, an end cover, a level gauge body, a vertical level bubble mechanism, an LED indicator mechanism and a 45° level bubble mechanism, wherein the end cover is arranged on two ends of the level gauge body, the vertical level bubble mechanism and the 45° level bubble mechanism are respectively arranged at two sides of the level gauge body, and the LED indicator mechanism is arranged in the middle of the level gauge body. The LED indicator mechanism of the level gauge comprises a horizontal bubble seat, a horizontal bubble cover, a horizontal bubble, a backlight, a battery holder, a battery cover, a PCB with angle sensor circuit, a front cover, a switch key, a calibration button, a buzzer, an anchor screw A, a horizontal bubble LED light, a vertical bubble seat and an anchor screw B, wherein the horizontal bubble cover is arranged above the horizontal bubble and at two sides thereof, the backlight is arranged below the horizontal bubble, the horizontal bubble cover, the horizontal bubble and the backlight are installed on the horizontal bubble seat, the horizontal bubble seat is fixed to the level gauge body through buckles at two ends, the PCB with angle sensor circuit is fixed to the battery holder through the anchor screw A, the battery holder is fixed to the level gauge body through the anchor screw C, and the front cover fixes the battery cover to the level gauge body through the anchor screw B.

The level gauge thereof is characterized in that the vertical level bubble mechanism comprises a bubble bracket, a vertical level bubble, a vertical level bubble seat, a vertical state LED light, an anchor screw D and a vertical bubble cover plate, wherein the vertical level bubble is installed on the horizontal level bubble seat, the vertical level bubble seat is fixed to the level gauge body through the anchor screw D, the vertical state LED light is installed in an LED fixing hole of the vertical level bubble seat, the vertical state LED light is connected with the PCB with angle sensor circuit through a power line, and the angle sensor circuit controls the lighting form of the LED light and changes in light colors.

The level gauge thereof is characterized in that the 45° level bubble mechanism comprises a 45° level bubble, a 45° level bubble seat, a 45° state LED light, an anchor screw E and a 45° bubble cover plate, wherein the 45° level bubble is installed on the 45° level bubble seat, the 45° level bubble seat is fixed to the level gauge body through the anchor screw E, the 45° state LED light is installed in an LED fixing hole of the 45° level bubble seat, the 45° state LED light is connected with the PCB with angle sensor circuit through a power line, and the angle sensor circuit controls the lighting form of the LED light and changes in light colors.

The level gauge thereof is characterized in that the level gauge body is made of an aluminum alloy profile.

The beneficial effects of the invention are as follows: the invention provides an electronic circuit of an acousto-optoelectronically indicated level gauge, i.e., an acousto-optoelectronically indicated design circuit device with high precision, so that a measuring device can be simply placed on a test plane to accurately display whether the current angle is in the preset angular range, thus dispensing with routine complex operations. The level gauge thereof is characterized by good reliability and high accuracy. For an ordinary level gauge, an operator can only judge whether the level gauge is in a horizontal, vertical or 45° angular position by visually observing whether the level bubble is in the middle position of two scale lines, thus there are uncertain factors. But the level gauge thereof is provided with an angle sensor circuit system, integrating the function that a measuring tool such as a level bar can measure and correct a measured object in a horizontal, vertical or 45° angular positions. In addition, an LED indicator mechanism is arranged on the level gauge, so that the level gauge thereof can display whether the current position of the level gauge is in a horizontal, vertical or 45° angular state or inclined state by changing the color of an LED backlight installed below the level bubble and changing the LED backlight to light on or flash.

DESCRIPTION OF THE PREFERRED EMBODIMENTS

Figure 1:
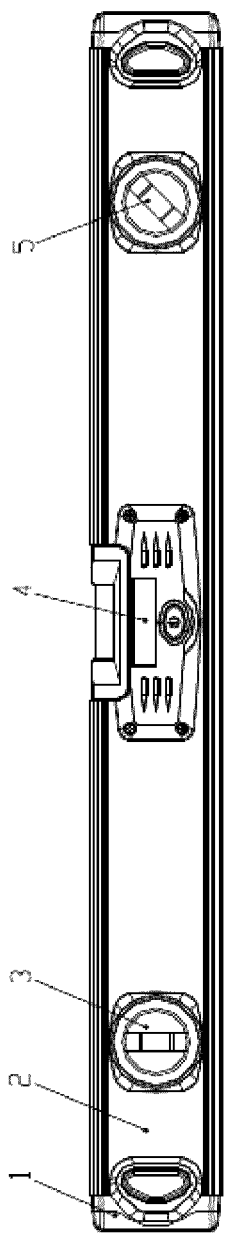
FIG. 1 is an outline drawing of a level gauge thereof in the invention.

The invention will be further described in combination with accompanying drawings.

Please refer to FIGS. 6-13 for an electronic circuit of an acousto-optoelectronically indicated level gauge, the electronic circuit for acousto-optoelectronic angle indication comprises a main control circuit (a), a power circuit (b), a key circuit (c), a sensor module circuit (d), an LED indicator module circuit (e), a buzzer module circuit (f) and a data storage module (g).

The control circuit (a) comprises a microcontroller U2, a capacitor C2, a capacitor C3, a capacitor C4, a capacitor C5, a capacitor C6, a capacitor C8, an electrolytic capacitor E1, a resistor R11, a resistor R12 and a resistor R20, one end of the capacitor C2 is connected with the 6th pin of the microcontroller U2, and the other end of the capacitor C2 is grounded; the 5th pin of the microcontroller U2 is connected with a +2.4V power supply, and connected with one end of the capacitor C3, one end of the capacitor C6, one end of the resistor R12 and the 9th pin of the microcontroller U2 in parallel, the other end of the capacitor C3 is grounded, the other end of the capacitor C6 is grounded, the other end of the resistor R12 is connected with one end of the resistor R11, one end of the capacitor C8 and the 10th pin of the microcontroller U2 in parallel, the other end of the resistor R11 is grounded, and the other end of the capacitor C8 is grounded; the 24th pin of the microcontroller U2 is connected with a +3.3V power supply, and connected with one end of the resistor R20, one end of the electrolytic capacitor E1 and one end of the capacitor C5 in parallel, the other end of the capacitor C5 is grounded, the other end of the electrolytic capacitor E1 is grounded, and the other end of the resistor R20 is connected with one end of the capacitor C4 and the 15th pin of the microcontroller U2.

The power circuit b comprises a power interface BATT, a field effect transistor Q8, a resistor R1, a capacitor C11, an electrolytic capacitor E2 and a voltage regulator module U1, one positive input end of the power interface BATT is connected with one end of the resistor R1, one end of the electrolytic capacitor E2 and the 2nd pin of the voltage regulator module U1 in parallel, and the other end of the power interface BATT is connected with a D pole of the field effect transistor Q8; the other end of the resistor R1 is connected with a G pole of the field effect transistor Q8 and one end of the capacitor C11 in parallel; the other end of the capacitor C11 and a S pole of the field effect transistor Q8 are grounded in parallel; the 1st pin of the voltage regulator module and the electrolytic capacitor E2 are grounded in parallel; and the 3rd pin of the voltage regulator module is connected with a +3.3V power voltage.

The key circuit c comprises a key SW, one end of the key SW is connected with the 16th pin of the microcontroller U2, and the other end of the key SW is grounded.

The sensor module circuit d comprises a sensor chip U4, a resistor R21, a capacitor C13, a capacitor C14 and a capacitor C18, the 1st, 3rd, 4th, 5th, 6th, 7th, 9th, 11th, 13th and the 16th pins of the sensor chip U4 are grounded, and connected with one end of the capacitor C13, one end of the capacitor C14 and one end of the capacitor C18 in parallel; the 14th pin and the 15th pin of the sensor chip U4 are connected with the other end of the capacitor C18 and one end of the resistor R21 in parallel; the other end of the resistor R21 is connected with a +2.4V power supply; the 10th pin of the sensor chip U4 is connected with the other end of the capacitor C13 and the 13th pin of the microcontroller U2; and the 12th pin of the sensor chip U4 is connected with the other end of the capacitor C14 and the 11th pin of the microcontroller U2.

The LED indicator module circuit (e) comprises a red-green light LED1, a red-green light LED2, a red-green light LED3, a resistor R3, a resistor R4, a resistor R5, a resistor R14, a resistor R17 and a resistor R19, one end of the red-green light LED1 is connected with a 3.3V power supply, one green end of the red-green light LED1 is connected with one end of the resistor R5, and the other end of the resistor R5 is connected with the 4th pin of the microcontroller U2; one red end of the LED1 is connected with the resistor R4, and the other end of the resistor R4 is connected with the 3rd pin of the microcontroller U2; one end of the LED2 is grounded, one green end of the LED2 is connected with one end of the resistor R14, and the other end of the resistor R14 is connected with the 26th pin of the microcontroller U2; one red end of the LED2 is connected with the resistor R17, and the other end of the resistor R17 is connected with the 25th pin of the microcontroller U2; one end of the LED3 is grounded, one green end of the LED3 is connected with the resistor R3, and the other end of the resistor R3 is connected with pin 23 of the microcontroller U2; and one red end of the LED3 is connected with one end of the resistor R19, and the other end of the resistor R19 is connected with the 22nd pin of the microcontroller U2.

The buzzer module circuit (f) comprises a buzzer BUZ and a resistor R22, one end of the buzzer BUZ is connected with the 2nd pin of the microcontroller U2, the other end of the buzzer is connected with one end of the resistor R22, and the other end of the R22 is connected with the 1st pin of the microcontroller U2.

The data storage module (g) comprises a memory U3, a resistor R10 and a resistor R13, the 8th pin of the memory U3 is connected with a power supply, the 1st, 2nd, 3rd and the 4th pins of the memory U3 are grounded, the 5th pin of the memory U3 is connected with one end of the resistor R13, the other end of the resistor R13 is connected with the 26th pin of the microcontroller U2 and also connected with the resistor R10, the 6th pin of the memory U3 is connected with the 27th pin of the microcontroller U2, and the 6th pin of the memory U3 is grounded.

Refer to FIG. 1, a level gauge thereof comprises an end cover 1, a level gauge body 2, a vertical level bubble mechanism 3, an LED indicator mechanism 4 and a 45° level bubble mechanism 5, wherein the level gauge body 2 is made of an aluminum alloy profile, the end cover 1 is arranged on two ends of the level gauge body 2, a battery holder 10 is arranged on the back of the LED indicator mechanism 4, the vertical level bubble mechanism 3 and the 45° level bubble mechanism 5 are respectively arranged at two sides of the LED indicator mechanism 4, and the LED indicator mechanism 4 is arranged in the middle of the level gauge body 2.

Figure 2:
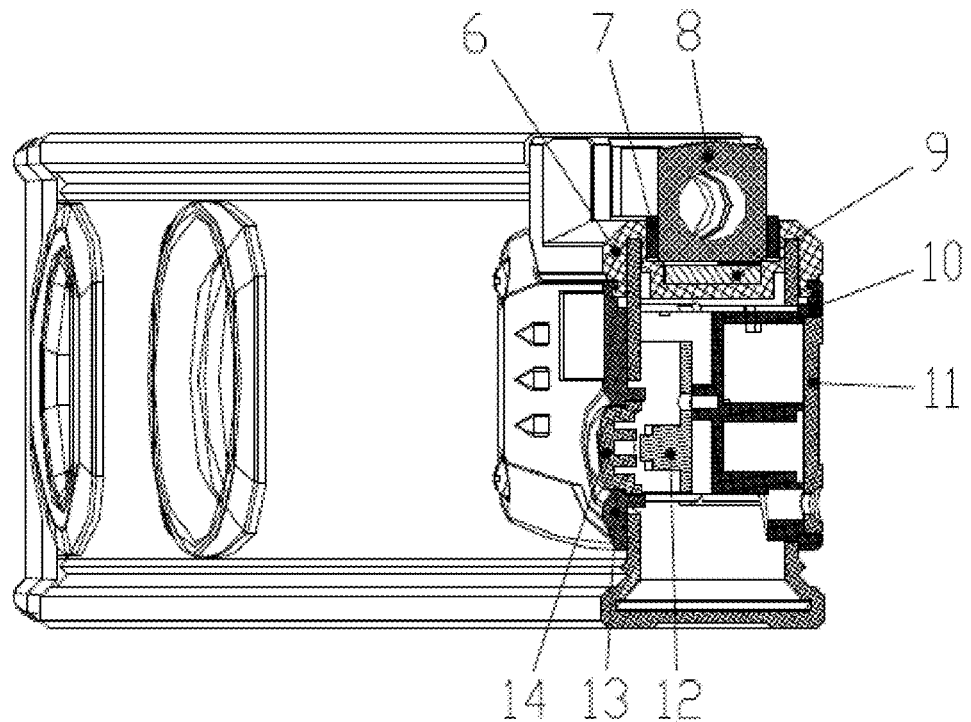
FIG. 2 is a structural diagram of an LED indicator mechanism of the level gauge thereof in the invention.
Figure 3:
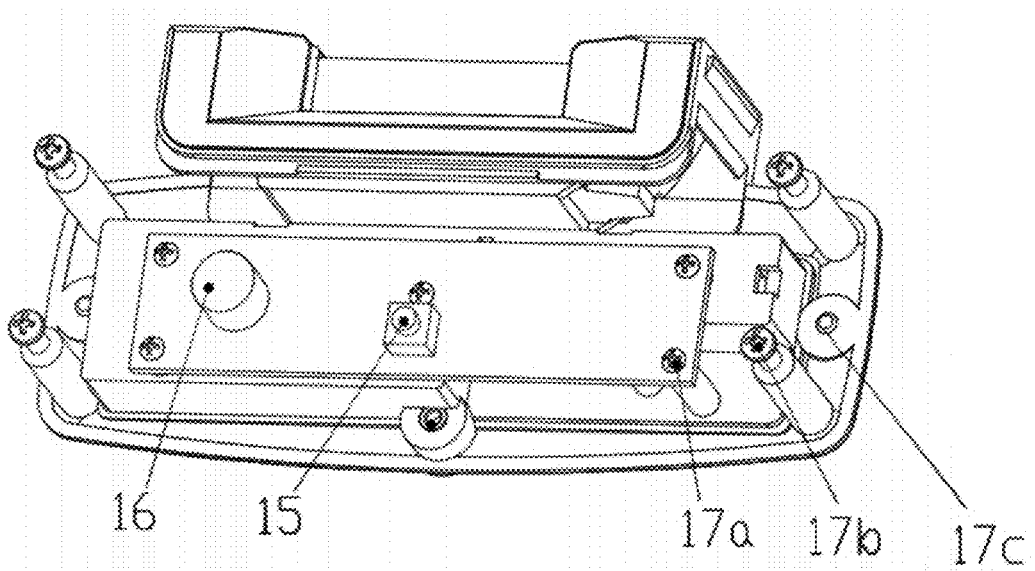
FIG. 3 is an internal structural diagram of the LED indicator mechanism of the level gauge thereof in the invention.

Refer to FIG. 2 and FIG. 3, the LED indicator mechanism 4 of the invention comprises a horizontal bubble seat 6, a horizontal bubble cover 7, a horizontal bubble 8, a backlight 9, a battery holder 10, a battery cover 11, a PCB with angle sensor circuit 12, a front cover 13, a switch key 14, a calibration button 15, a buzzer 16 and an anchor screw A17, wherein the horizontal bubble cover 7 is arranged above the horizontal bubble and at two sides thereof, the backlight 9 is arranged below the horizontal bubble 8, the horizontal bubble cover 7, the horizontal bubble 8 and the backlight 9 are installed on the horizontal bubble seat 6, the horizontal bubble seat 6 is fixed to the level gauge body 2 through buckles at two ends, the PCB with angle sensor circuit 12 is fixed to the battery cover 11 through an anchor screw A17a, the battery cover 11 is fixed to the level gauge body 2 through an anchor screw C 17c, and the front cover 13 fixes the battery cover 1 to the level gauge body 2 through an anchor screw B17b.

Operating instructions: when the angle sensor circuit system detects that the level gauge thereof is currently in a horizontal state, the LED backlight 11 of the LED indicator mechanism 4 will give out normally-on green backlight. The backlight lights up the horizontal level bubble 8, and meanwhile, the buzzer 16 makes a voice prompt. When the angle sensor circuit system detects that the level gauge thereof is currently in a sub-horizontal state, that is, a specific angular range between the inclined state and the judged horizontal state set by the angle sensor circuit system, the LED backlight 11 of the LED indicator mechanism 4 will give out flashing light to alert the operator that horizontal correction has to be performed on the measured object. When the angle sensor circuit system detects that the level gauge thereof is currently in an inclined state, the LED backlight of the LED indicator mechanism 4 will give out normally-on red backlight to alert the operator that the measured object is currently in an inclined state. The calibration button 15 is used for initial angle calibration of the level gauge thereof.

Figure 4:
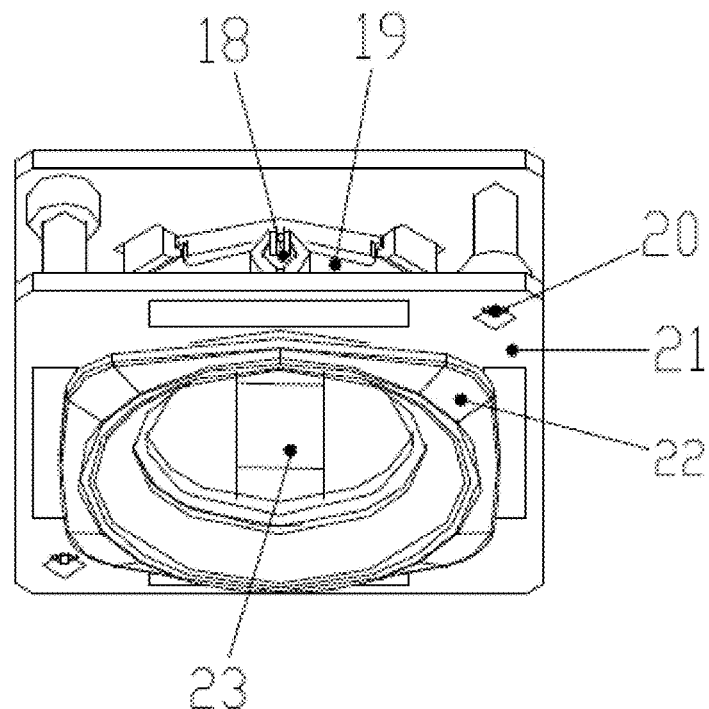
FIG. 4 is a structural diagram of a vertical level bubble mechanism of the level gauge thereof in the invention.

Refer to FIG. 4, the vertical level bubble mechanism 3 of the invention comprises a vertical bubble LED light 18, a vertical bubble seat 19, an anchor screw D20, a bubble bracket 21, a vertical level bubble 23, a vertical level bubble seat 19, a vertical state LED light 18, an anchor screw D 20 and a vertical bubble cover plate 22, wherein the vertical level bubble 23 is installed on the horizontal level bubble seat 19, the vertical level bubble seat 23 is fixed to the level gauge body 2 through the anchor screw D 20, the vertical state LED light 18 of the vertical bubble cover plate 22 is installed in an LED fixing hole of the vertical level bubble seat 19, the vertical state LED light 18 is connected with the PCB with angle sensor circuit 12 through a power line, and the angle sensor circuit controls the lighting form of the LED light and changes in light colors.

Operating instructions: a red-green LED light is installed on the vertical level bubble seat 19, when the angle sensor circuit system detects that the level gauge thereof is currently in a vertical state, the green LED light on the vertical level bubble seat 19 is normally on, lighting up the vertical level bubble 23, and meanwhile, the buzzer 16 makes a voice prompt. When the angle sensor circuit system detects that the level gauge thereof is currently in a sub-vertical state, that is, a specific angular range between the inclined state and the judged vertical state set by the angle sensor circuit system, the green LED light on the vertical level bubble seat 23 will give out flashing light to alert the operator that vertical correction has to be performed on the measured object. When the angle sensor circuit system detects that the level gauge thereof is currently in an inclined state, the red LED light on the vertical level bubble seat 23 is normally on to alert the operator that the measured object is currently in an inclined state.

Figure 5:
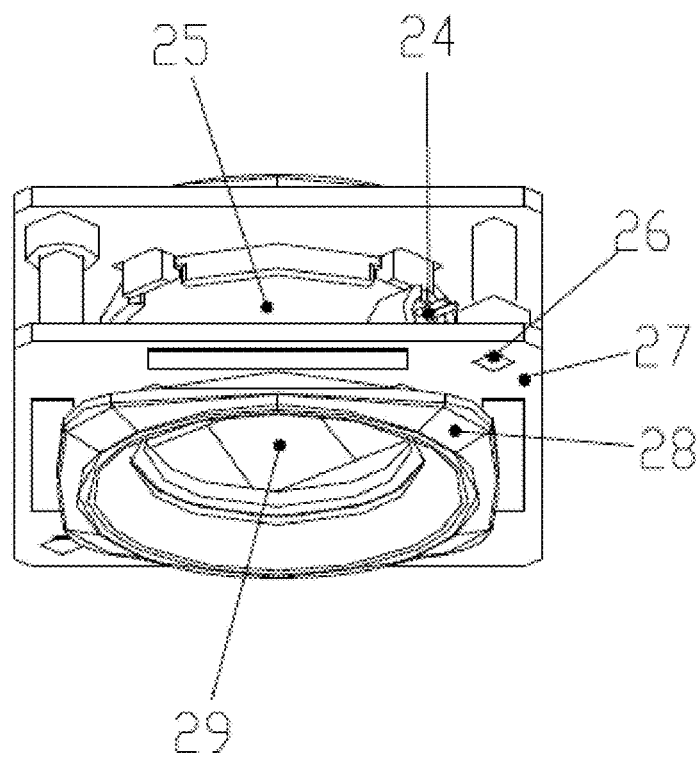
FIG. 5 is a structural diagram of a 45° level bubble mechanism of the level gauge thereof in the invention.
Figure 6:
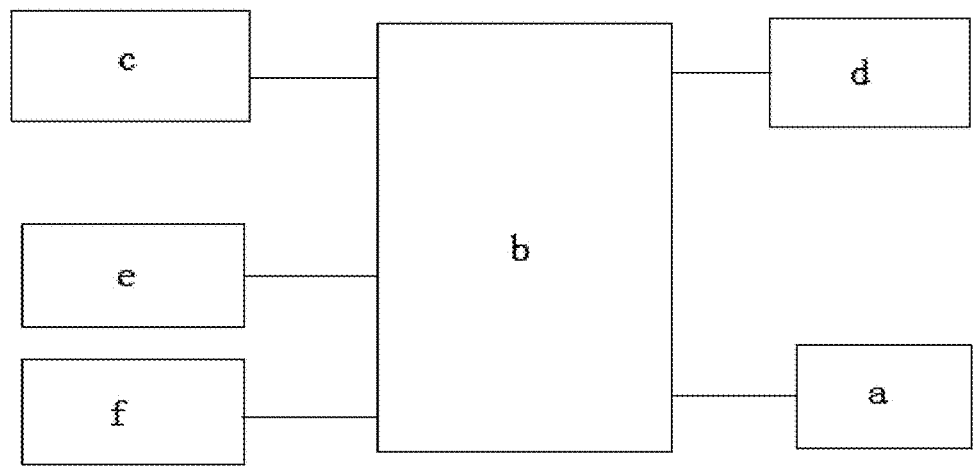
FIG. 6 is a block circuit diagram of an electronic circuit for acousto-optoelectronic angle indication in the invention.
Figure 7:
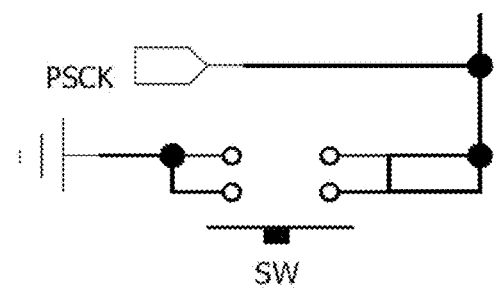
FIG. 7 is a key circuit diagram of the electronic circuit for acousto-optoelectronic angle indication in the invention.
Figure 8:
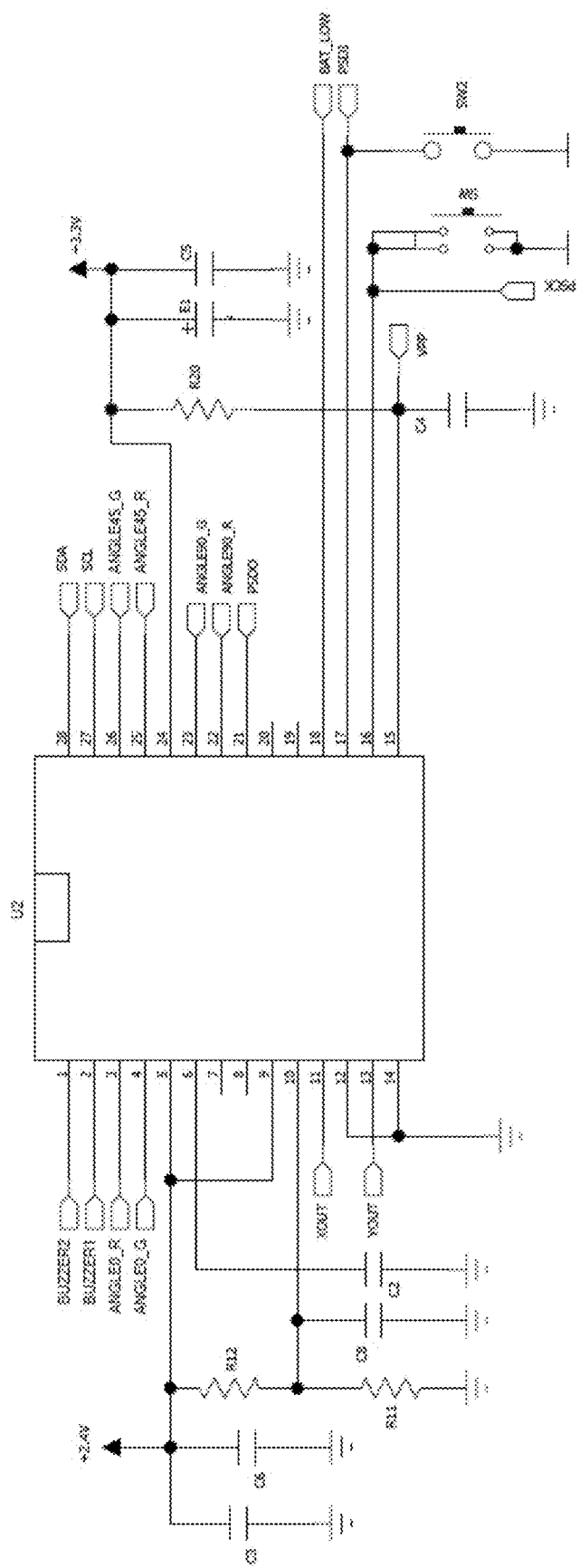
FIG. 8 is a control circuit diagram of the electronic circuit for acousto-optoelectronic angle indication in the invention.
Figure 9:
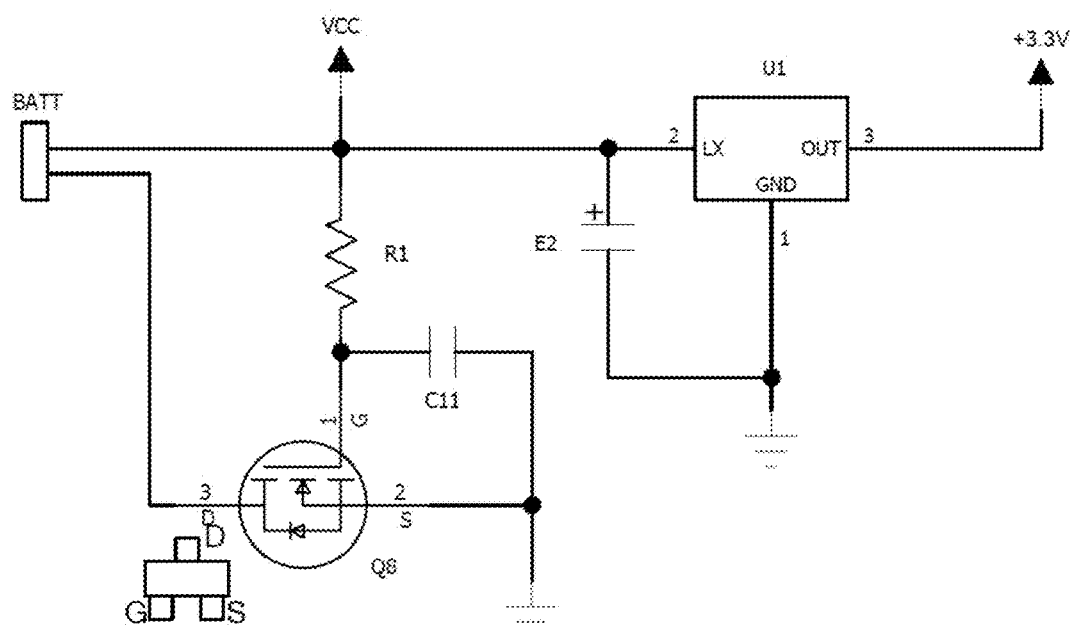
FIG. 9 is a power circuit diagram of the electronic circuit for acousto-optoelectronic angle indication in the invention.
Figure 10:
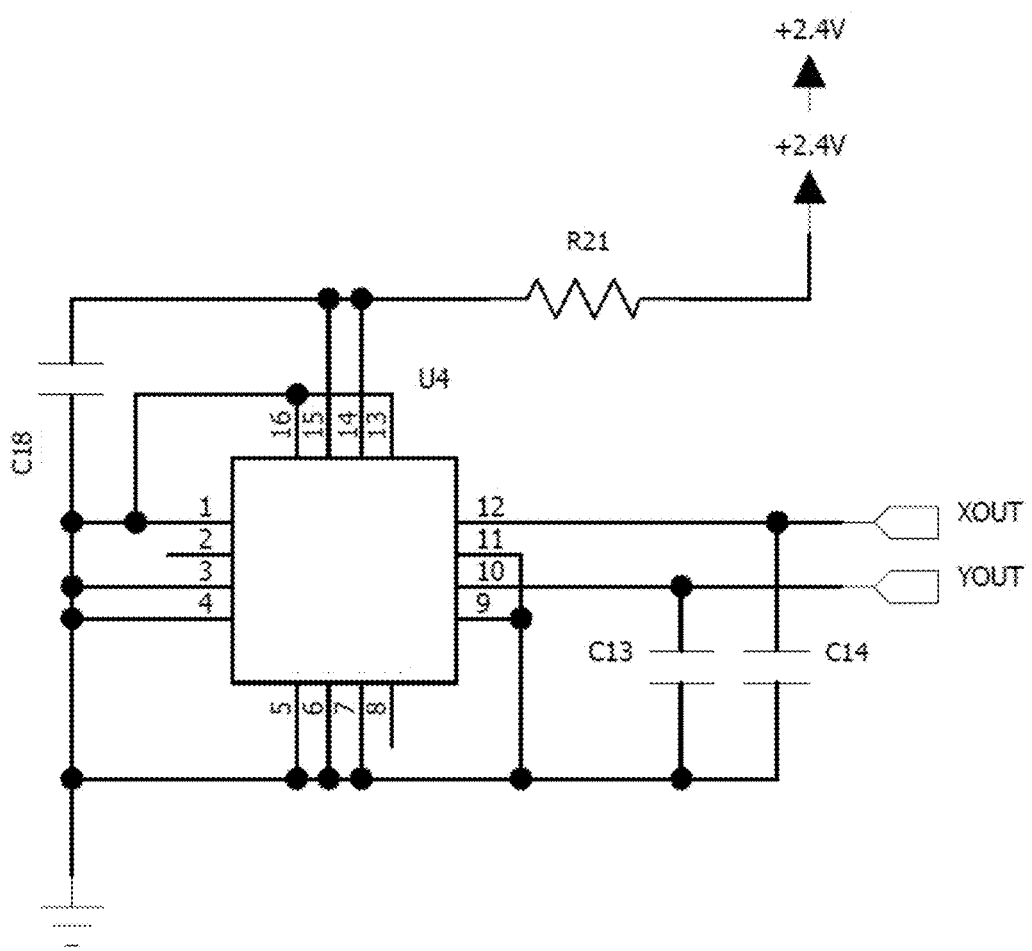
FIG. 10 is a sensor module circuit diagram of the electronic circuit for acousto-optoelectronic angle indication in the invention.
Figure 11:
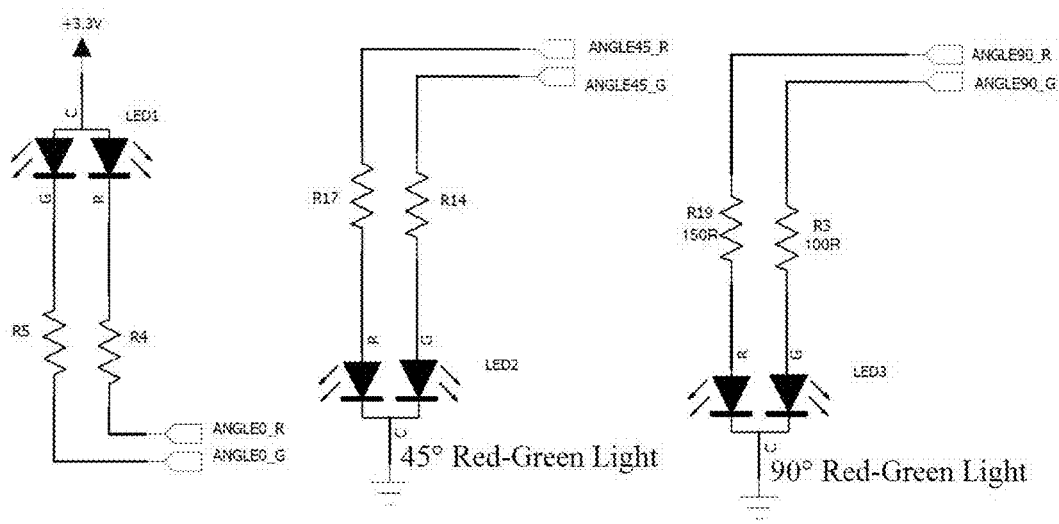
FIG. 11 is a display module circuit diagram of the electronic circuit for acousto-optoelectronic angle indication in the invention.
Figure 12:
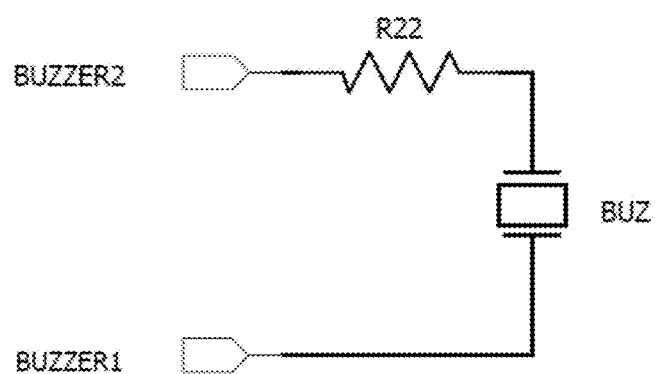
FIG. 12 is a buzzer module circuit diagram of the electronic circuit for acousto-optoelectronic angle indication in the invention.
Figure 13:
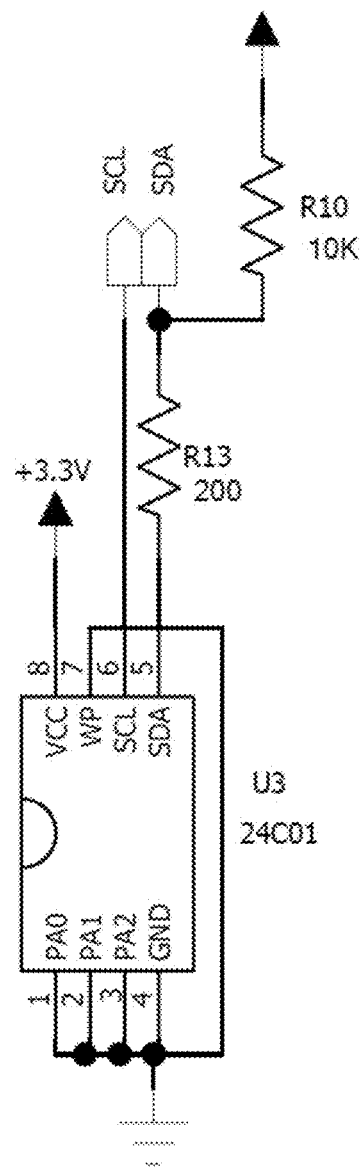
FIG. 13 is a data storage module circuit diagram of the electronic circuit for acousto-optoelectronic angle indication in the invention.

Refer to FIG. 5, the 45° level bubble mechanism 5 of the invention comprises a 45° level bubble 29, a 45° level bubble seat 25, a 45° state LED light 24, an anchor screw E26 and a 45° bubble cover plate 28, wherein the 45° level bubble 29 is installed on the 45° level bubble seat 25, the 45° level bubble seat 25 is fixed to the level gauge body 2 through the anchor screw E26, the 45° state LED light 24 is installed in an LED fixing hole of the 45° level bubble seat 25, the 45° state LED light 24 is connected with the PCB with angle sensor circuit 12 through a power line, and the angle sensor circuit controls the lighting form of the LED light and changes in light colors.

Operating instructions: a red-green LED light is installed on the 45° bubble seat 25, when the angle sensor circuit system detects that the level gauge thereof is currently in a 45° state, the green LED light on the 45° bubble seat 25 is normally on, lighting up the 45° level bubble 29, and meanwhile, the buzzer 16 makes a voice prompt. When the angle sensor circuit system detects that the level gauge thereof is currently in a sub-45° state, that is, a specific angular range between the inclined state and the judged 45° state set by the angle sensor circuit system, the green LED light on the 45° bubble seat 25 will give out flashing light to alert the operator that 45° correction has to be performed on the measured object. When the angle sensor circuit system detects that the level gauge thereof is currently not in a 45° state, the red LED light of the LED indicator mechanism is normally on to alert the operator that the measured object is currently not in a 45° state.

In the preferred embodiment of the level gauge thereof in the invention, the vertical level bubble mechanism and the 45° level bubble mechanism can be eliminated, or either of the vertical level bubble mechanism and the 45° level bubble mechanism can be reserved to form different level gauges thereof so as to meet different requirements.

In the preferred embodiment of the level gauge thereof in the invention, the LED backlight of the LED indicator mechanism, the vertical state LED light of the vertical level gauge and the 45° state LED light of the 45° level gauge can be set to other colors to form different level gauges thereof so as to meet different requirements.

In the preferred embodiment of the level gauge thereof in the invention, the LED backlight of the LED indicator mechanism, the vertical state LED light of the vertical level bubble mechanism and the LED light of the LED indicator mechanism of the 45° state LED light of the 45° level bubble mechanism can be set to normally open, transiently on, flashing or other lighting forms to form different level gauges thereof so as to meet different requirements.

The invention is described in details in combination with the accompanying drawings and embodiments. Various changes can be made to the invention by those skilled in the art based on the description. Any modification, equivalent replacement and improvement made within the spirits and rules of the invention shall be incorporated in the protection scope of the invention. Therefore, the invention shall not be restricted to some details in the embodiments, and the protection scope of the invention is to be specified by the claims of the invention.

The invention claimed is:

1. An electronic circuit for acousto-optoelectronic angle indication, comprising: a main control circuit (a), a power circuit (b), a key circuit (c), a sensor module circuit (d), an LED indicator module circuit (e), a buzzer module circuit (f) and a data storage module (g);

wherein the control circuit (a) comprises a microcontroller (U2), a capacitor (C2), a capacitor (C3), a capacitor (C4), a capacitor (C5), a capacitor (C6), a capacitor (C8), an electrolytic capacitor (E1), a resistor (R11), a resistor (R12) and a resistor (R20), one end of the capacitor (C2) is connected with the 6th pin of the microcontroller (U2), and the other end of the capacitor (C2) is grounded; the 5th pin of the microcontroller (U2) is connected with a +2.4V power supply, and connected with one end of the capacitor (C3), one end of the capacitor (C6), one end of the resistor (R12) and the 9th pin of the microcontroller (U2) in parallel, the other end of the capacitor (C3) is grounded, the other end of the capacitor (C6) is grounded, the other end of the resistor (R12) is connected with one end of the resistor (R11), one end of the capacitor (C8) and the 10th pin of the microcontroller (U2) in parallel, the other end of the resistor (R11) is grounded, and the other end of the capacitor (C8) is grounded; the 24th pin of the microcontroller (U2) is connected with a +3.3V power supply, and connected with one end of the resistor (R20), one end of the electrolytic capacitor (E1) and one end of the capacitor (C5) in parallel, the other end of the capacitor (C5) is grounded, the other end of the electrolytic capacitor (E1) is grounded, and the other end of the resistor (R20) is connected with one end of the capacitor (C4) and the 15th pin of the microcontroller (U2);

the power circuit (b) comprises a power interface (BATT), a field effect transistor (Q8), a resistor (R1), a capacitor (C11), an electrolytic capacitor (E2) and a voltage regulator module (U1), one positive input end of the power interface (BATT) is connected with one end of the resistor (R1), one end of the electrolytic capacitor (E2) and the 2nd pin of the voltage regulator module (U1) in parallel, and the other end of the power interface (BATT) is connected with a D pole of the field effect transistor (Q8); the other end of the resistor (R1) is connected with a G pole of the field effect transistor (Q8) and one end of the capacitor (C11) in parallel; the other end of the capacitor (C11) and a S pole of the field effect transistor (Q8) are grounded in parallel; the 1st pin of the voltage regulator module and the electrolytic capacitor (E2) are grounded in parallel; and the 3rd pin of the voltage regulator module (U1) is connected with a +3.3V power voltage;

the key circuit (c) comprises a key (SW), one end of the key (SW) is connected with the 16th pin of the microcontroller (U2), and the other end of the key (SW) is grounded; the sensor module circuit (d) comprises a sensor chip (U4), a resistor (R21), a capacitor (C13), a capacitor (C14) and a capacitor (C18), the 1st, 3rd, 4th, 5th, 6th, 7th, 9th, 11th, 13th and the 16th pins of the sensor chip (U4) are grounded, and connected with one end of the capacitor (C13), one end of the capacitor (C14) and one end of the capacitor (C18) in parallel; the 14th pin and 15th pin of the sensor chip (U4) are connected with the other end of the capacitor (C18) and one end of the resistor (R21) in parallel; the other end of the resistor (R21) is connected with a +2.4V power supply; the 10th pin of the sensor chip (U4) is connected with the other end of the capacitor (C13) and the 13th pin of the microcontroller (U2); and the 12th pin of the sensor chip (U4) is connected with the other end of the capacitor (C14) and pin 11 of the microcontroller (U2);

the LED indicator module circuit (e) comprises a red-green light (LED1), a red-green light (LED2), a red-green light (LED3), a resistor (R3), a resistor (R4), a resistor (R5), a resistor (R14), a resistor (R17) and a resistor (R19), one end of the red-green light (LED1) is connected with a 3.3V power supply, one green end of the red-green light (LED1) is connected with one end of the resistor (R5), and the other end of the resistor (R5) is connected with th 4th pin of the microcontroller (U2); one red end of the red-green light (LED1) is connected with the resistor (R4), and the other end of the resistor (R4) is connected with the 3rd pin of the microcontroller (U2); one end of the red-green light (LED2) is grounded, one green end of the red-green light (LED2) is connected with one end of the resistor (R14), and the other end of the resistor (R14) is connected with the 26th pin of the microcontroller (U2); one red end of the red-green light 2 (LED2) is connected with the resistor (R17), and the other end of the resistor (R17) is connected with the 25th pin of the microcontroller (U2); one end of the red-green light (LED3) is grounded, one green end of the red-green light (LED3) is connected with the resistor (R3), and the other end of the resistor (R3) is connected with the 23rd pin of the microcontroller (U2); and one red end of the red-green light (LED3) is connected with one end of the resistor (R19), and the other end of the resistor (R19) is connected with the 22nd pin of the microcontroller (U2);

the buzzer module circuit (f) comprises a buzzer (BUZ) and a resistor (R22), one end of the buzzer (BUZ) is connected with the 2nd pin of the microcontroller (U2), the other end of the buzzer is connected with one end of the resistor (R22), and the other end of the resistor (R22) is connected with the 1st pin of the microcontroller (U2); and the data storage module (g) comprises a memory (U3), a resistor (R10) and a resistor (R13), the 8th pin of the memory (U3) is connected with a power supply, the 1st, 2nd, 3rd and the 4th pins of the memory (U3) are grounded, the 5th pin of the memory (U3) is connected with one end of the resistor (R13), the other end of the resistor (R13) is connected with the 26th pin of the microcontroller (U2) and also connected with the resistor (R10), the 6th pin of the memory (U3) is connected with pin 27 of the microcontroller (U2), and the 6th pin of the memory (U3) is grounded.

2. A level gauge comprising the electronic circuit for acousto-optoelectronic angle indication according to claim 1, comprising an end cover, a level gauge body, a vertical level bubble mechanism, an LED indicator mechanism and a 45° level bubble mechanism, wherein the end cover is arranged on two ends of the level gauge body, the vertical level bubble mechanism and the 45° level bubble mechanism are respectively arranged at two sides of the level gauge body, and the LED indicator mechanism is arranged in the middle of the level gauge body.

3. The level gauge according to claim 2, wherein,
the LED indicator mechanism comprises a horizontal bubble seat, a horizontal bubble cover, a horizontal bubble, a backlight, a battery holder, a battery cover, a PCB with angle sensor circuit, a front cover, a switch key, a calibration button, a buzzer, an anchor screw A, a horizontal bubble LED light, a vertical bubble seat and an anchor screw B, wherein the horizontal bubble cover is arranged above the horizontal bubble and at two sides thereof, the backlight is arranged below the horizontal bubble, the horizontal bubble cover, the horizontal bubble and the backlight are installed on the horizontal bubble seat, the horizontal bubble seat is fixed to the level gauge body through buckles at two ends, the PCB with angle sensor circuit is fixed to the battery cover through the anchor screw A, the battery cover is fixed to the level gauge body through the anchor screw C, and the front cover fixes the battery cover to the level gauge body through the anchor screw B.

4. The level gauge according to claim 2, wherein,
the vertical level bubble mechanism comprises a bubble bracket, a vertical level bubble, a vertical level bubble seat, a vertical state LED light, an anchor screw D and a vertical bubble cover plate, wherein the vertical level bubble is installed on the horizontal level bubble seat, the vertical level bubble seat is fixed to the level gauge body through the anchor screw D, the vertical state LED light is installed in an LED fixing hole of the vertical level bubble seat, the vertical state LED light is connected with the PCB with angle sensor circuit through a power line, and the angle sensor circuit controls the lighting form of the LED light and changes in light colors.

5. The level gauge according to claim 2, wherein,
the 45° level bubble mechanism comprises a 45° level bubble, a 45° level bubble seat, a 45° state LED light, an anchor screw E and a 45° bubble cover plate, wherein the 45° level bubble is installed on the 45° level bubble seat, the 45° level bubble seat is fixed to the level gauge body through the anchor screw E, the 45° state LED light is installed in an LED fixing hole of the 45° level bubble seat, the 45° state LED light is connected with the PCB with angle sensor circuit through a power line, and the angle sensor circuit controls the lighting form of the LED light and changes in light colors.

\* \* \* \* \*